US012604087B2

(12) United States Patent (10) Patent No.: US 12,604,087 B2
Anabuki et al. (45) Date of Patent: Apr. 14, 2026

(54) INFORMATION PROCESSING APPARATUS, SHOOTING SYSTEM, METHOD, AND NON-TRANSITORY COMPUTER-READABLE STORAGE MEDIUM THAT DETERMINE WHETHER IMAGE QUALITIES ARE FAVORABLE

(71) Applicants:CANON KABUSHIKI KAISHA, Tokyo (JP); Central Nippon Highway Engineering Tokyo Company Limited, Tokyo (JP)

(72) Inventors: Mahoro Anabuki, Kanagawa (JP); Hirokuni Fujioka, Saitama (JP); Naoya Nishida, Tokyo (JP); Masatsugu Sahara, Kanagawa (JP)

(73) Assignees: Canon Kabushiki Kaisha, Tokyo (JP); Central Nippon Highway Engineering Tokyo Company Limited, Tokyo (JP)

( * ) Notice: Subject to any disclaimer, the term of this patent is extended or adjusted under 35 U.S.C. 154(b) by 357 days.

(21) Appl. No.: 18/067,919

(22) Filed: Dec. 19, 2022

(65) Prior Publication Data

US 2023/0199300 A1 Jun. 22, 2023

(30) Foreign Application Priority Data

Dec. 22, 2021 (JP) ................................. 2021-208441

(51) Int. Cl.
*H04N 23/60* (2023.01)
*G06T 7/00* (2017.01)
*G06T 7/70* (2017.01)
(52) U.S. Cl.
CPC ........... *H04N 23/64* (2023.01); *G06T 7/0002* (2013.01); *G06T 7/70* (2017.01); *G06T 2207/20212* (2013.01); *G06T 2207/30168* (2013.01)

(58) Field of Classification Search
CPC ......... H04N 23/64; G06T 7/0002; G06T 7/70; G06T 2207/20212; G06T 2207/30168
See application file for complete search history.

(56) References Cited

U.S. PATENT DOCUMENTS 10,762,619 B2 9/2020 Nonaka
11,210,773 B2 12/2021 Kuwabara et al.
(Continued)

FOREIGN PATENT DOCUMENTS

JP 6619761 B 12/2019
JP 2021-069818 A 5/2021
(Continued)

OTHER PUBLICATIONS

Office Action issued Sep. 12, 2025, in corresponding Japanese Patent Application No. 2021-208441, with English translation (9 pages).
(Continued)

*Primary Examiner* — Kelly L Jerabek
(74) *Attorney, Agent, or Firm* — Venable LLP

(57) ABSTRACT

An information processing apparatus including a storage unit configured to store pieces of image quality information, respectively, for a plurality of images that show a subject, a determination unit configured to determine whether image qualities of the images are favorable based on the pieces of image quality information of the images, a composition unit configured to generate a composite image using images that have been determined to have favorable image qualities by the determination unit, and a notification unit configured, in a case when there is a missing pixel area in the composite image, to provide a notification about a re-shooting method for the subject corresponding to the missing pixel area, wherein the determination unit determines whether the (Continued)

image qualities of the images are favorable based on a shooting resolution, focus, and blurring.

18 Claims, 5 Drawing Sheets

(56) References Cited

U.S. PATENT DOCUMENTS

| | | | | |
|---|---|---|---|---|
| 2012/0033960 | A1* | 2/2012 | Hashimoto | F16M 11/046 |
| | | | | 396/428 |
| 2018/0367732 | A1* | 12/2018 | Baldwin | H04N 23/632 |
| 2020/0074586 | A1* | 3/2020 | Kawai | H04N 23/667 |
| 2020/0250806 | A1* | 8/2020 | Kuwabara | G06T 5/50 |
| 2021/0281748 | A1* | 9/2021 | Nogami | H04N 23/631 |
| 2021/0327677 | A1* | 10/2021 | Schoenmakers | G06V 20/693 |
| 2021/0352208 | A1* | 11/2021 | Yonaha | H04N 23/61 |
| 2022/0207756 | A1* | 6/2022 | Ren | G06T 7/0002 |

FOREIGN PATENT DOCUMENTS

| | | |
|---|---|---|
| WO | 2019031086 A | 2/2019 |
| WO | 2020008973 A | 1/2020 |
| WO | 2020162264 A | 8/2020 |

OTHER PUBLICATIONS

Japanese Office Action issued Feb. 9, 2026, in corresponding Japanese Application No. 2021-208441.

* cited by examiner

| NUMBER | SHOOTING RESOLUTION | FOCUS | BLURRING | DETERMINATION ABOUT IMAGE QUALITY |
|--------|--------------------|-------|----------|-----------------------------------|
| 1 | ○ | ○ | ○ | ○ |
| 2 | ○ | ○ | × | × |
| 3 | ○ | × | × | ○ |
| 4 | : | : | : | : |
| 5 | : | : | : | : |

203 MISSING SECTION B ATTRIBUTED TO POOR IMAGE QUALITY

201

204 MISSING SECTION C ATTRIBUTED TO FAILURE IN SHOOTING

202 MISSING SECTION A ATTRIBUTED TO SHORTAGE OF OVERLAP

203  REVIEW SHOOTING SETTINGS

201

204  REVIEW SETTINGS OF SHUTTER

202  REDUCE SPEED AT WHICH LOCATION OF SHOOTING IS CHANGED

INFORMATION PROCESSING APPARATUS, SHOOTING SYSTEM, METHOD, AND NON-TRANSITORY COMPUTER-READABLE STORAGE MEDIUM THAT DETERMINE WHETHER IMAGE QUALITIES ARE FAVORABLE

CROSS REFERENCE TO PRIORITY APPLICATION

This application claims the benefit of Japanese Patent Application No. 2021-208441, filed Dec. 22, 2021, which is hereby incorporated by reference herein in its entirety.

BACKGROUND OF THE INVENTION

Field of the Invention

The present invention relates to an information processing apparatus, a shooting system, a method, and a non-transitory computer-readable storage medium.

Description of the Related Art

An inspector of a structure, such as a bridge and a tunnel, checks the positions and extents of deformations (cracks, water leakage, and so forth) on the surfaces of the structure, and records the inspection result. In general, a civil engineer visually checks whether there are deformations on the surfaces of the structure, and records the positions, sizes, and the like, of the deformations on, for example, a hand-held notebook. However, in the recent years, there has been a problem of a labor shortage in civil engineers who inspect structures due to, for example, aging of civil engineers. To address this problem, "image-based inspection" has been performed whereby the surfaces of a structure are shot with high definition using an image capturing apparatus (camera), and deformations are checked and recorded based on shot images using an image analysis technique.

In image-based inspection, an interchangeable-lens, a high-definition image capturing apparatus (camera) that supports a large number of pixels is mounted on, for example, an automatic tripod head or a drone, and the surfaces of a structure to be inspected are exhaustively shot using the image capturing apparatus. In a case when the surfaces of a structure, such as a bridge and a tunnel, are shot with a resolution that allows detection of deformations (cracks), several tens to several hundreds of shot images are obtained. However, as each shot image only shows a small area of the structure, an inspector cannot understand which area of the structure has been shot from each shot image. For this reason, respective shot images are stitched (composited) to generate a large-scale stitched image (composite image) that shows the surfaces of the structure in a wider range. In this way, by performing shooting in such a manner that respective shooting ranges overlap one another at the time of shooting, shot images can be composited together.

A technique has been disclosed that determines an abnormality, such as missing data in shot images that have been shot by a shooting apparatus mounted on an unmanned flight vehicle, and specifies images that need to be re-shot in accordance with whether there is an abnormality. Specifically, images to be re-shot are specified by detecting a data abnormality, such as missing image data, at the time of communication of shot images (Japanese Patent No. 6619761).

SUMMARY OF THE INVENTION

The present invention, in one aspect, provides an information processing apparatus comprising a storage unit configured to store pieces of image quality information respectively for a plurality of images that show a subject, a determination unit configured to determine whether image qualities of the images are favorable based on the pieces of image quality information of the images, a composition unit configured to generate a composite image using images that have been determined to have favorable image qualities by the determination unit, and a notification unit configured, in a case when there is a missing pixel area in the composite image, to provide a notification about a re-shooting method for the subject corresponding to the missing pixel area.

The present invention in one aspect, provides a shooting system comprising a mobile object including shooting unit configured to shoot a subject, and an information processing apparatus that processes images shot by the shooting unit, wherein the information processing apparatus includes a storage unit configured to store pieces of image quality information respectively for a plurality of images that show the subject, a determination unit configured to determine whether image qualities of the images are favorable based on the pieces of image quality information of the images, a composition unit configured to generate a composite image using images that have been determined to have favorable image qualities by the determination unit, and a notification unit configured, in a case when there is a missing pixel area in the composite image, to provide a notification about a re-shooting method for the subject corresponding to the missing pixel area.

The present invention, in one aspect, provides a shooting system comprising a tripod head, a shooting unit configured to shoot a subject, the shooting unit being mounted on the tripod head, and an information processing apparatus that processes images shot by the shooting unit, wherein the information processing apparatus includes a storage unit configured to store pieces of image quality information respectively for a plurality of images that show the subject, a determination configured to determine whether image qualities of the images are favorable based on the pieces of image quality information of the images, a composition unit configured to generate a composite image using images that have been determined to have favorable image qualities by the determination unit, and a notification unit configured, in a case when there is a missing pixel area in the composite image, to provide a notification about a re-shooting method for the subject corresponding to the missing pixel area.

The present invention, in one aspect, provides a method comprising storing pieces of image quality information respectively for a plurality of images that show a subject, determining whether image qualities of the images are favorable based on the pieces of image quality information of the images, generating a composite image using images that have been determined to have favorable image qualities by the determining, and, in a case when there is a missing pixel area in the composite image, providing a notification about a re-shooting method for the subject corresponding to the missing pixel area.

The present invention, in one aspect, provides a non-transitory computer-readable storage medium storing a program that, when executed by a computer, causes the computer to perform a method of an information processing apparatus comprising storing pieces of image quality information respectively for a plurality of images that show a subject, determining whether image qualities of the images are favorable based on the pieces of image quality information of the images, generating a composite image using images that have been determined to have favorable image qualities by the determining, and, in a case when there is a missing pixel area in the composite image, providing a notification about a re-shooting method for the subject corresponding to the missing pixel area.

Further features of the present invention will become apparent from the following description of exemplary embodiments (with reference to the attached drawings).

BRIEF DESCRIPTION OF THE DRAWINGS

FIG. 1A is a diagram showing an exemplary configuration of functions of an information processing apparatus.

FIG. 1B is a diagram showing examples of determination information obtained by determining the image quality of shot image data.

DESCRIPTION OF THE EMBODIMENTS

Figure 2:
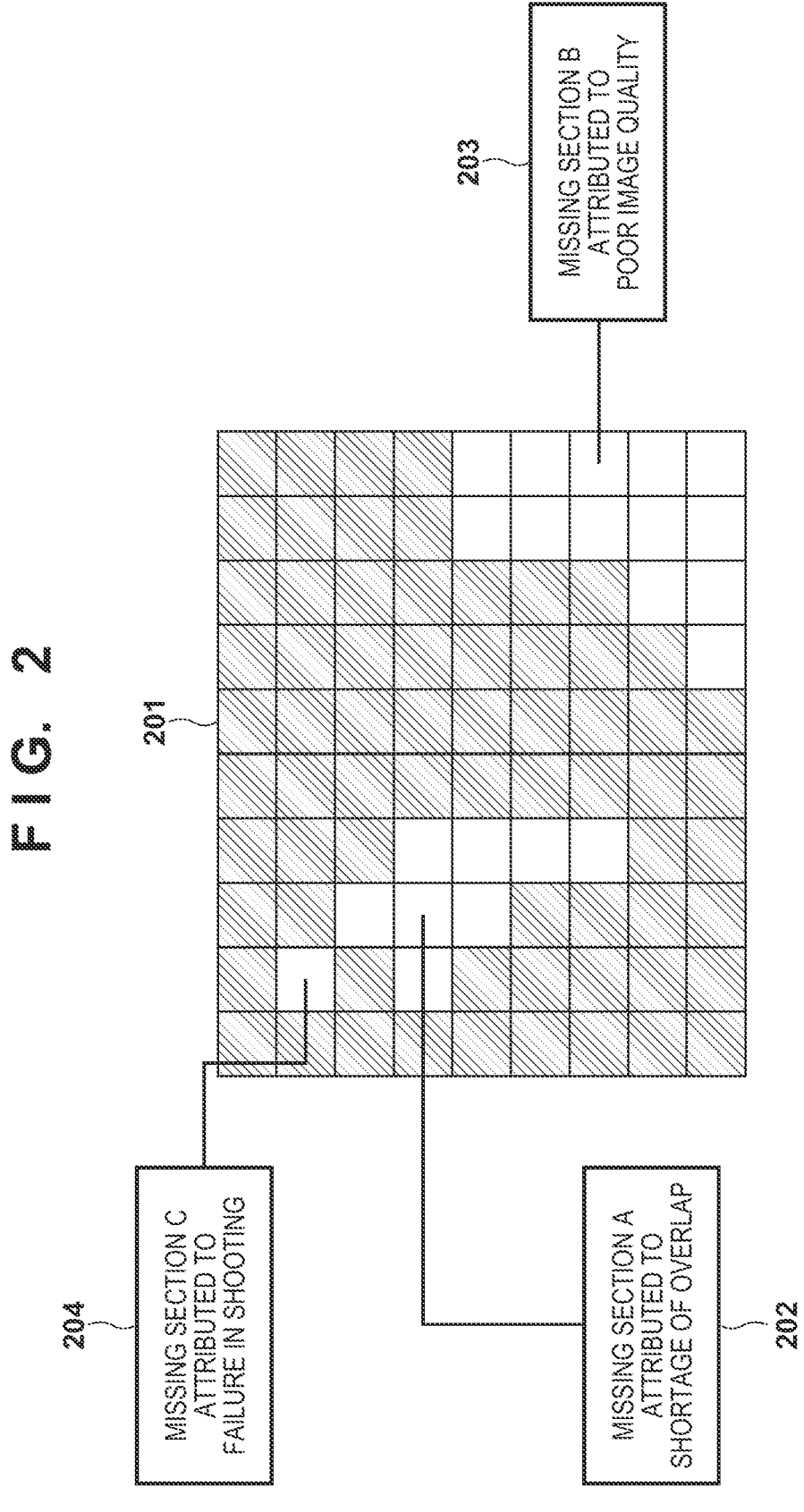
FIG. 2 is a diagram showing an example of a composite image generated by the information processing apparatus.

Hereafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and a redundant description thereof is omitted.

According to the present invention, a subject that needs to be re-shot can be efficiently shot.

First Embodiment

An information processing apparatus stores respective pieces of image quality information of a plurality of images that show a subject, and determines whether the image qualities of the images are favorable based on the pieces of image quality information of the images. The information processing apparatus generates a composite image with use of images that have been determined to have favorable image qualities, and, in a case when there is a missing pixel area in the composite image, provides a notification about a method of re-shooting a subject corresponding to the missing pixel area. Note that, although the information processing apparatus is mounted on a mobile object (drone) or a tripod head, it may be mounted on any apparatus on which the information processing apparatus can be mounted. Furthermore, the information processing apparatus may not be mounted on a mobile object (drone) or a tripod head, and an information processing apparatus that is separately prepared may control a mobile object (drone) or a tripod head via, for example, wireless communication. Moreover, data may be exchanged between a mobile object (drone) or a tripod head and the information processing apparatus via a removable storage medium. In this case, a shooting system that includes the information processing apparatus and the mobile object (drone) is configured. Here, image quality information denotes a plurality of elements with which the image quality of an image obtained by shooting a subject is evaluated (e.g., a shooting resolution, focus, and blurring). The image quality denotes the quality of an image obtained by shooting a subject. Whether the image quality is favorable is determined based on whether at least one of the plurality of elements of the image quality information is favorable. A composite image denotes one image obtained by compositing a plurality of images obtained by shooting a subject.

The following describes the reason why a technique to assist an inspector in determining the image quality and making a judgment on re-shooting is necessary. For example, in inspection of an extremely thin crack with a width of 0.2 mm on the surface of a structure, the extremely thin crack may not be shown in images unless the shooting settings of an image capturing apparatus (camera) are appropriately configured. Among the shooting settings, especially a shooting resolution (an actual dimension corresponding to one pixel in an image), focus (focal point), and blurring are important in ensuring the quality of the image (hereafter, image quality). When the inspector inspects a crack with a width of 0.2 mm or more, it is sufficient that the shooting resolution be higher than 0.5 mm/pixel. When the inspector inspects a crack with a width of 0.05 mm or more, it is sufficient that the shooting resolution be higher than 0.3 mm/pixel. It is possible to shoot a crack thinner than the shooting resolution. However, in shooting of a much thinner crack, it is necessary to shoot the crack with a higher shooting resolution. For example, in a bridge inspection under the domestic jurisdiction, cracks with a width of 0.05 mm or more are the targets of inspection, and it is recommended to perform shooting with a shooting resolution higher than 0.3 mm/pixel (the Ministry of Land, Infrastructure, Transport and Tourism (March 2021, Manual for Delivery of Three-Dimensional Deliverable Using Inspection Assistance Technique (Image Measurement Technique (Draft)).

Focus adjustment exerts a large influence on how cracks are shown in shot images. For example, in images obtained by shooting cracks in an out-of-focus state, extremely thin cracks are not shown due to defocus. In image-based inspection, as the entirety of shot images shows the surface of a structure (hereafter, an inspection surface), it is necessary to configure settings related to shooting of an image capturing apparatus so as to bring the entirety of the shot images into focus. That is to say, it is necessary to set a diaphragm (f-number) so that the depth of field (the range that is in focus) includes the closest point through to the farthest point of the inspection surface. The larger the f-number, the deeper the depth of field, and the wider the range that is in focus. However, increasing the f-number will reduce the shutter speed, thereby making a subject (cracks) easily blurred.

Also, a drastic increase in the f-number causes defocus called "small-aperture defocus", and exerts an influence on how cracks are shown. Furthermore, shaking of an image capturing apparatus (camera) at the time of shooting of cracks exerts an influence on how cracks are shown. In blurry images, the appearance of cracks are such that the cracks are not easily distinguishable from stains on the surface of a structure. Although increasing the ISO film speed can increase the shutter speed of the image capturing apparatus (camera), setting the ISO film speed too high will cause ISO noise. As the ISO film speed exerts an influence on how cracks are shown in shot images, it is necessary to adjust the shooting conditions so that shooting can be performed without blur while avoiding an increase in the value of the ISO film speed whenever possible.

As described above, the matters to be kept in mind during shooting at the time of inspection of a structure are clear. However, as optimum setting values vary depending on the shooting condition, they cannot be determined in advance. For example, the focal length that realizes a necessary shooting resolution varies depending on the distance from the image capturing apparatus (camera) to the target of shooting (a crack). As a necessary depth of field varies depending on the direction of the surface to be shot (the surface with a crack), an optimum f-number varies. As the brightness of the surrounding of the target of shooting (a crack) also varies depending on the weather, the shutter speed necessary for shooting images without blur varies as well. For example, in a case when the surface of a structure is shot using an image capturing apparatus (camera) mounted on a drone, the distance between the image capturing apparatus (camera) and the target of shooting, as well as the direction of the surface to be shot, may change immediately before shooting depending on the wind condition at the time of shooting. Furthermore, an optimum value of a shutter speed for shooting without blur changes due to a sudden gust of wind at the time of shooting.

In view of the above-described conditions, the image qualities of shot images are determined after the surface of a structure has been shot, and, if there is a shot image that is inappropriate for inspection by an inspector, the location to be re-shot and the method for improving the image qualities of shot images are specified, and re-shooting is performed. Here, in terms of cost reduction, the determination of the image qualities of shot images and the judgment on whether re-shooting is necessary are made immediately after shooting at the site of shooting. For example, in a case when a structure to be inspected is far from the office of the inspector, and, in a case when it is necessary to make arrangements, for example, to rent shooting equipment, re-shooting of the target of inspection is difficult because it incurs a large amount of effort. In general, the determination of the image qualities of shot images and the judgment on whether re-shooting is necessary are made based on the experience and know-how of the inspector. However, it is difficult to make these determinations and judgments appropriately in a short amount of time. In view of this, there is a need for a technique to assist the inspector in determining the image qualities and making a judgment on re-shooting.

Figure 1A:
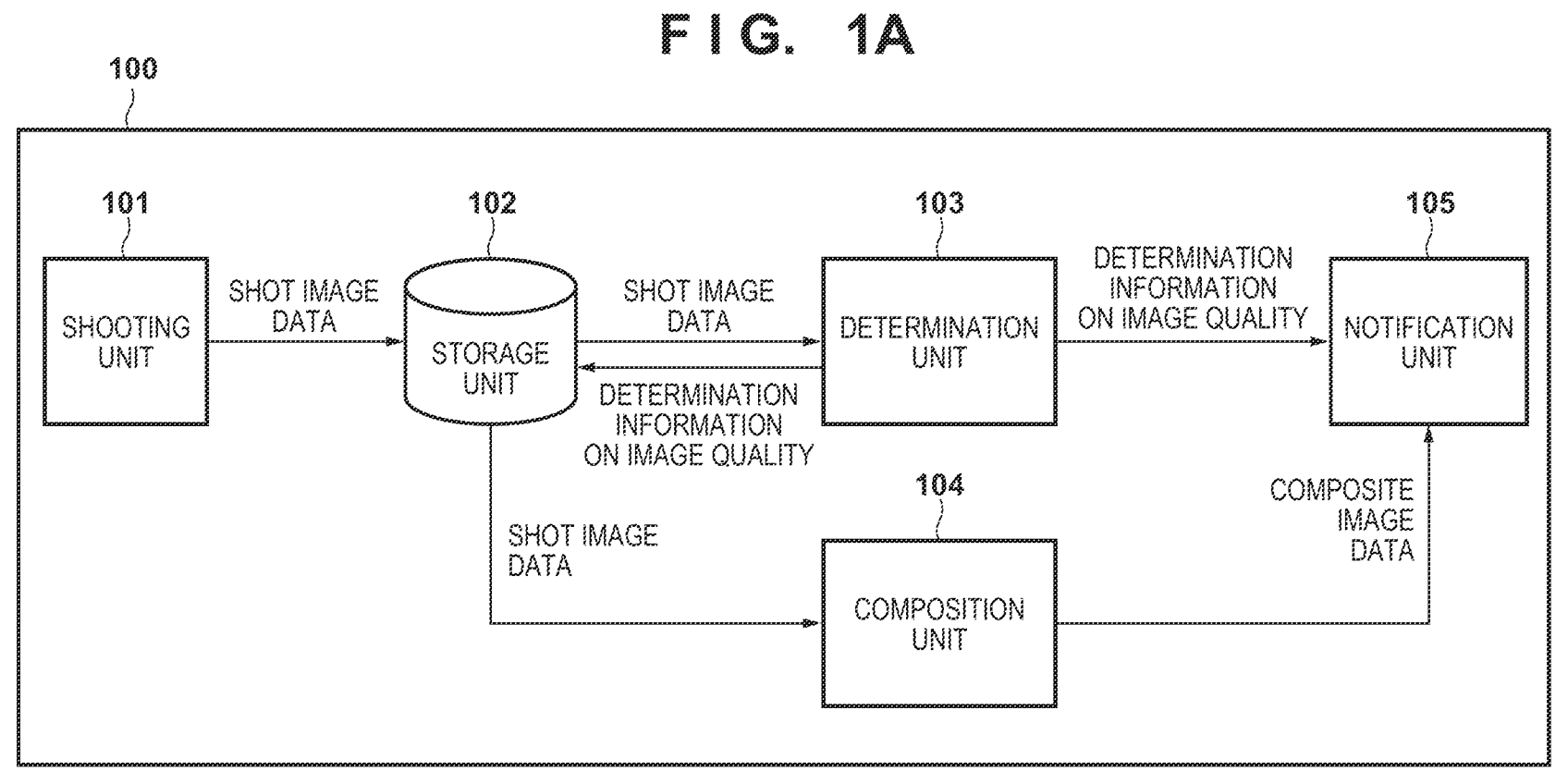

FIG. 1A is a diagram showing an exemplary configuration of functions of an information processing apparatus. An information processing apparatus 100 includes a shooting unit 101, a storage unit 102, a determination unit 103, a composition unit 104, and a notification unit 105.

The shooting unit 101 is an image capturing apparatus that shoots a subject, and includes a camera mounted on, for example, a mobile object (e.g., a drone), a tripod head, and the like. The shooting unit 101 captures images of the surfaces of a structure to be inspected (referred to as inspection target surfaces), and generates shot image data. "Shot image data" includes image data of an inspection target, model names of the image capturing apparatus and a lens, such camera parameters as the focal length, shutter speed, and ISO film speed at the time of shooting, information of a shooting distance from the shooting unit 101 to the subject, and pieces of in-focus degree information of a shot image (defocus values). The shooting unit 101 obtains information of a shooting distance from the shooting unit 101 to the subject with use of, for example, known means, such as a distance measurement apparatus included in the shooting unit 101.

The shooting unit 101 includes, for example, two photo-electric conversion units in which a sensor included in the shooting unit 101 performs photoelectric conversion on a per-pixel basis. The shooting unit 101 calculates pieces of in-focus degree information (defocus values) of a shot image based on the phase difference between two images that are respectively recorded in the photoelectric conversion units. A piece of in-focus degree information is represented by, for example, a value of 0.0 or more for each pixel. In a case when a piece of in-focus degree information indicates 0.0, it means that there is no phase difference between two images in that pixel, and that a pixel is in focus. In a case when a piece of in-focus degree information indicates 0.0 or more, it means that there is a phase difference corresponding to a numerical value between two images in that pixel, and that the pixel is out of focus.

The mobile object (drone) or tripod head on which the shooting unit 101 is mounted may be controlled by means of a user operation or an automatic operation. No matter which one of the user operation and the automatic operation controls the shooting unit 101, the shooting unit 101 obtains a plurality of shot images by exhaustively shooting the inspection target surfaces while changing a shooting range with respect to the subject. In order to cause the composition unit 104 to composite the shot images, the shooting unit 101 shoots images in such a manner that the shooting ranges of respective inspection target surfaces overlap (overlie) one another.

For example, the shooting unit 101 may perform shooting in such a manner that respective shooting ranges overlap (overlie) one another by repeating still image shooting. Alternatively, the shooting unit 101 may obtain shot image data in which respective shooting ranges overlap one another by extracting (capturing) still images from moving images after the moving images have been shot. Here, the timing of shooting of still images and the timing of extraction of still images from moving images may be no particular timings based on a user setting, or may be timings automatically set by the shooting unit 101. The shooting unit 101 transmits a plurality of pieces of shot image data that have been obtained to the storage unit 102.

The storage unit 102 is a storage apparatus that stores various types of data inside the information processing apparatus 100, and includes, for example, an HDD, an SSD, a RAM, a ROM, and the like. The storage unit 102 receives the pieces of shot image data from the shooting unit 101, and stores the pieces of shot image data into various types of storage mediums. Under an instruction from a CPU (not shown) included in the information processing apparatus 100, the storage unit 102 transmits the pieces of shot image data to the determination unit 103. The storage unit 102 receives determination information obtained as a result of the determination unit 103 determining whether the image qualities of the pieces of shot image data are favorable (equivalent to a determination result). Under an instruction from the CPU (not shown), the storage unit 102 transmits only the pieces of shot image data with favorable image qualities to the composition unit 104 based on the determination information.

The determination unit 103 receives pieces of shot image data from the storage unit 102, and determines the image qualities of the pieces of shot image data. The determination unit 103 transmits determination information obtained by determining the image qualities of the pieces of shot image data to the storage unit 102 and the notification unit 105. The determination unit 103 calculates a shooting resolution, which is included in image quality information, with use of the following expression 1 based on a shooting distance from the shooting unit 101 to a subject (an inspection target surface), the camera's sensor size, the focal length, and the number of pixels. Image quality information includes, for example, a shooting resolution, focus, and blurring.

$$\text{Shooting resolution} = \frac{\text{Shooting distance} \times \text{Sensor size}}{\text{Focal length} \times \text{Number of pixels}} \quad (1)$$

The shooting distance and the focal length are information recorded in shot image data. The sensor size and the number of pixels are numerical values that are unique to each of the models of image capturing apparatuses (cameras). Therefore, the determination unit 103 obtains the unique numerical values with reference to, for example, a database stored in the storage unit 102, or the like, based on model information of the image capturing apparatus (camera) recorded in shot image data. The determination unit 103 determines the image quality of shot image data by comparing the shooting resolution calculated based on expression 1 with a base shooting resolution that has been recorded in advance in the storage unit 102, or the like. That is to say, the determination unit 103 determines that the image quality of shot image data is favorable in a case when the numerical value of the shooting resolution is equal to or greater than the numerical value of the base shooting resolution. On the other hand, the determination unit 103 determines that the image quality of shot image data is not favorable in a case when the numerical value of the shooting resolution is smaller than the numerical value of the base shooting resolution.

Next, a description is given of an example in which the determination unit 103 determines whether the image quality of shot image data is favorable with use of the "focus" included in image quality information. The determination unit 103 determines whether the image quality is favorable based on pieces of in-focus degree information recorded in shot image data. Shot image data includes, for example, values of pieces of in-focus degree information of respective pixels in a shot image. As described earlier, in a case when the numerical value of a piece of in-focus degree information of each pixel is 0.0, it means that the pixel is in focus. In a case when the numerical value is a numerical value larger than 0.0, it means that the pixel is out of focus in accordance with that numerical value.

The determination unit 103 determines whether focus is favorable with respect to each shot image based on the extent to which the entirety of the shot image includes pixels with a predetermined numerical value or less. For example, in a case when pixels with pieces of in-focus degree information having a numerical value of 1.0 or less account for at least 50% of the entirety of the shot image, the determination unit 103 determines that focus of the shot image is favorable. On the other hand, in a case when pixels with pieces of in-focus degree information having a numerical value of 1.0 or less account for less than fifty percent of the entirety of the shot image, the determination unit 103 determines that focus of the shot image is not favorable.

Furthermore, a description is given of an example in which the determination unit 103 determines whether the image quality of shot image data is favorable with use of "blurring" included in image quality information. The determination unit 103 determines whether blurring is included by performing frequency analysis with respect to image data recorded in shot image data. In a case when shot image data includes blurring, cracks, and the like, are shown in a wide range in a shot image, and thus the shot image data has a low frequency. In view of this, the determination unit 103 calculates a spatial frequency for each area in the shot image with use of, for example, a known method, such as a Fourier transform. The determination unit 103 determines whether the shot image data includes blurring based on an average value obtained by averaging the frequency components that have been calculated for respective areas in the shot image. That is to say, in a case when the average value indicates a high frequency, the determination unit 103 determines that the shot image data does not include blurring. On the other hand, in a case when the average value indicates a low frequency, the determination unit 103 determines that the shot image data includes blurring.

The determination unit 103 determines the image quality of shot image data from the storage unit 102, generates "determination information" indicating whether the image quality of the shot image data is favorable, and transmits the determination information to the storage unit 102 and the notification unit 105. Here, in a case when the determination unit 103 determines one element included in image quality information from the shot image data (one of the shooting resolution, focus, and blurring), a determination result related to one element is used as the determination information. In a case when the determination unit 103 determines a plurality of elements included in image quality information from the shot image data, a determination result based on the combination of the plurality of elements is used as the determination information.

FIG. 1B is a diagram showing examples of determination information obtained as a result of the determination unit 103 determining the image quality of shot image data (a determination result). In a table of determination information 110, ○ indicates that the image quality is favorable, and x indicates that the image quality is not favorable. The determination information 110 includes numbers indicating the determination order, the shooting resolution, focus, blurring, and the determination about the image quality. For example, in a case when the determination unit 103 determines that all elements of image quality information (the shooting resolution, focus, and blurring) are favorable, it generates determination information (a determination result) indicating that the image quality of shot image data is favorable. Specifically, in a case when the shooting resolution is ○, focus is ○, and blurring is ○ with regard to "number=1", the determination unit 103 determines that the image quality is ○.

On the other hand, in a case when the determination unit 103 determines that one of the elements of image quality information (e.g., blurring) is not favorable, it generates determination information 110 indicating that the image quality of shot image data is not favorable. Specifically, in a case when the shooting resolution is ○, focus is ○, and blurring is x with regard to "number=2", the determination unit 103 determines that the image quality is x. Alternatively, for example, in a case when the determination unit 103 determines that one of the elements of image quality information (e.g., the shooting resolution) is favorable, it may generate determination information indicating that the image quality of shot image data is favorable. Specifically, in a case when the shooting resolution is ○, focus is x, and blurring is x with regard to "number=3", the determination unit 103 determines that the image quality is ○. Note that, as shown in FIG. 1B, determination information 110 may include a determination result about respective elements (the shooting resolution, focus, and blurring) for evaluating the image quality of shot image data.

The composition unit 104 receives pieces of shot image data from the storage unit 102, and generates composite image data by compositing the pieces of shot image data using a known method. For example, in a case when pieces of shot image data that have been shot using a fixed tripod head are to be composited, the composition unit 104 composites together the pieces of shot image data using a method of panoramic composition. Also, in a case when pieces of shot image data that have been shot using a mobile object (drone) are to be composited, the composition unit 104 composites together the pieces of shot image data using a method of three-dimensional reconfiguration. In a case when the foregoing methods are used, the composition unit 104 is not always capable of compositing all pieces of shot image data. For example, in a case when the composition unit 104 generates a composite image using pieces of shot image data that include a few areas that overlap with (overlie) other pieces of shot image data, it may not be capable of generating a composite image with no missing pixel. A missing pixel means a pixel for which no pixel value has been recorded.

FIG. 2 is a diagram showing an example of a composite image generated by the information processing apparatus. In FIG. 2, the composite image 201 includes an area 202, an area 203, and an area 204. The area 202 is an area in which a total of eight pixels are missing, and is "a missing section A attributed to a shortage of overlap (overlying images)". There are cases when the composition unit 104 generates the composite image 201 including missing pixels as indicated by the area 202 of the composite image 201.

Also, the pieces of shot image data that are used to generate the composite image 201 do not represent all of the pieces of shot image data that have been shot by the shooting unit 101, but consist only of pieces of shot image data for which the image qualities have been determined to be favorable by the determination unit 103. Therefore, the section (pixels) for which the image qualities have not been determined to be favorable in pieces of shot image data is not used to generate the composite image 201, and is thus displayed as the area 203 in the composite image 201. The area 203 is an area in which a total of thirteen pixels are missing, and is "a missing section B attributed to poor image quality".

Furthermore, in a case when pieces of shot image data include an unshot section because the shooting unit 101 failed to shoot a subject (inspection target surfaces) due to a certain reason, this section is displayed as the area 204 in the composite image 201. Examples of the certain reason include a case when the shooting unit 101 mounted on a mobile object (drone) that is moving at high speed cannot shoot a desired subject area, and a case when a shutter cannot be released due to, for example, a poor connection at a contact point between the image capturing apparatus and the lens in the shooting unit 101. The area 204 is an area in which one pixel is missing, and is "a missing section C attributed to a failure in shooting".

As described above, after generating the composite image 201, the composition unit 104 specifies the areas 202 to 204 in the composite image 201 for which no pixel value has been recorded (pixels are missing). Next, the composition unit 104 estimates the reasons for missing pixels in the area 204 (missing section C), the area 203 (missing section B), and the area 202 (missing section A), in stated order. Note that the order of estimation of the reasons for missing pixels is exemplary, and no limitation is intended by this.

For example, the composition unit 104 specifies "used pieces of shot image data" that compose the surroundings of the area 203 and the area 204, and that were used to generate the composite image 201, and specifies used pieces of shot image data with shooting orders that are adjacent to shooting orders of used pieces of shot image data. For example, it is expected that there is no unallocated number (missing data) in used pieces of shot image data with shooting orders that are adjacent to shooting orders of used pieces of shot image data that compose the surrounding of the area 204 (the missing section C attributed to a failure in shooting). For example, the composition unit 104 can determine whether there is an unallocated number (missing data) in pieces of shot image data based on whether there are unique numbers (e.g., serial numbers) that have been respectively allocated to used pieces of shot image data. Therefore, in a case when the composition unit 104 determines that there is no unallocated number (missing data) in used pieces of shot image data located in the surrounding of the area 204, it estimates that the reason for missing pixels in the area 204 (missing section C) is a "shortage of images". Here, the "shortage of images" includes the reasons for missing pixels attributed to "a failure in shooting" and "a shortage of overlap". Note that the composition unit 104 can determine whether the reason for missing pixels in the area 204 (missing section C) is "a failure in shooting" or "a shortage of overlap" as described later.

On the other hand, in a case when there is an unallocated number (missing data) in used pieces of shot image data with shooting orders that are adjacent to shooting orders of used pieces of shot image data, it means that there is shot image data that the composition unit 104 has not received from the storage unit 102. That is to say, it is expected that there is an unallocated number (missing data) in used pieces of shot image data with shooting orders that are adjacent to shooting orders of used pieces of shot image data that compose the surrounding of the area 203 (the missing section B attributed to poor image quality). Therefore, in a case when the composition unit 104 determines that there is an unallocated number (missing data) in used pieces of shot image data located in the surrounding of the area 203, it estimates that the reason for missing pixels in the area 203 is "poor image quality".

As another estimation method, the composition unit 104 may specify, from among pieces of shot image data received from the storage unit 102, pieces of shot image data that were not used to generate the composite image 201 (referred to as unused pieces of shot image data). The composition unit 104 specifies pieces of shot image data that have shooting times close to shooting times of the unused pieces of shot image data (e.g., the difference between the former shooting times and the latter shooting times falls within a predetermined range), and that were used to generate the composite image 201 (referred to as used pieces of shot image data). The composition unit 104 specifies a portion of the composite image 201 that the used pieces of shot image data compose (i.e., the positions of the used pieces of shot image data in the composite image 201). For example, it is expected that used pieces of shot image data that compose the surrounding of the area 203 (the missing section B attributed to poor image quality) in the composite image 201 have shooting times close to shooting times of the unused pieces of shot image data. In view of this, in a case when a missing pixel area is included in the surrounding of the used pieces of shot image data specified from the composite image 201, the composition unit 104 estimates that the reason for missing pixels in the area 203 is "poor image quality". Also, regarding an area for which the reason for missing pixels has not been determined to be "poor image quality" (e.g., the area 204), the composition unit 104 can estimate that the reason for missing pixels therein is the "shortage of images".

Furthermore, the composition unit 104 can determine whether the "shortage of images" has occurred due to the "shortage of overlap" in used images, or has occurred due to the "failure in shooting", which is a shortage of pieces of shot image data that are used to generate the composite image 201. The composition unit 104 determines whether the "shortage of images" has been caused by the "shortage of overlap" or the "failure in shooting" using the following method.

First, the composition unit 104 estimates the reason for missing pixels in the area 202 using the estimation method that is used in estimating the reason for missing pixels in the area 204 (missing section C) ("shortage of images"). Consequently, the composition unit 104 estimates that the reason for missing pixels in each of the area 202 and the area 204 is the "shortage of images". Furthermore, the composition unit 104 determines whether the reason for missing pixels in each area is the "failure in shooting" or "shortage of overlap" based on whether the number of missing pixels (the size of the missing pixel area) in each of the area 202 and the area 204 exceeds a predetermined threshold.

The predetermined threshold is the number of missing pixels, and is assumed to be four, for example. In a case when the composition unit 104 determines that the number of mixing pixels in the area 204 of FIG. 2 (one) does not exceed the predetermined threshold (e.g., four), it estimates that the reason for missing pixels in the area 204 is the "failure in shooting". On the other hand, in a case when the composition unit 104 determines that the number of mixing pixels in the area 202 (eight) exceeds the predetermined threshold (e.g., four), it estimates that the reason for missing pixels in the area 202 is the "shortage of overlap".

Note that FIG. 2 depicts a case when the number of mixing pixels in the area 202 (eight) is greater than the number of mixing pixels in the area 204 (one). However, in a case when the shooting unit 101 has failed in shooting of a subject (there is a shortage of images that can be used for the composite image 201), there is a high possibility of the occurrence of missing pixels throughout a wide range in composite image 201). That is to say, as the missing pixel area attributed to the failure in shooting (the area 204) is greater than the missing pixel area attributed to the shortage of overlap (the area 202), the number of mixing pixels in the area 204 can be larger than that in the area 202. Therefore, the composition unit 104 can determine whether the reason for missing pixels ("shortage of images") is the "failure in shooting" or "shortage of overlap" by setting the predetermined threshold in consideration of the number of mixing pixels.

Below is a description of another estimation method for a case when the reason for missing pixels is the "failure in shooting". The composition unit 104 obtains a communication history related to a defect in the contact point between the image capturing apparatus (camera) and the lens in the shooting unit 101, which can cause the "failure in shooting" (information including time and an event, and information of a shutter interval). Then, the composition unit 104 specifies used images that were shot at shooting times adjacent to the time of failure to release the shutter of the camera (the occurrence of a shooting failure event). In this way, the composition unit 104 can estimate that the reason for missing pixels in the area 204 is the "failure in shooting"

based on whether there is a missing pixel area in the surrounding of the used images that were specified from the composite image 201 using the foregoing method. Furthermore, a description is now given of another estimation method for a case when the reason for missing pixels is the "shortage of overlap". The composition unit 104 may obtain the time at which a subject was shot when the moving speed of the mobile object (drone) on which the shooting unit 101 is mounted exceeded a threshold, and specify used images that were shot at shooting times adjacent to the obtained time. In this way, the composition unit 104 can estimate that the reason for missing pixels in the area 202 is the "shortage of overlap" based on whether there is a missing pixel area in the surrounding of the used images that were specified from the composite image 201 using the foregoing method. The threshold for the moving speed of the mobile object (drone) may be any numerical value of a speed at which the "shortage of overlap" occurs when the shooting unit 101 shoots a subject.

After estimating the reasons for missing pixels in the areas 202 to 204, the composition unit 104 records respective estimation results in the composite image data in association with the coordinates of the areas 202 to 204 in the composite image 201. The composition unit 104 transmits the generated composite image data to the notification unit 105.

Based on the determination information on the image qualities of pieces of shot image data from the determination unit 103 and on the composite image data from the composition unit 104, the notification unit 105 provides a notification about methods of re-shooting a subject (inspection target surfaces) to be used by the shooting unit 101. In the composite image data, the coordinates of the areas 202 to 204 in the composite image 201 and the reasons for missing pixels in the areas 202 to 204 are recorded in association with each other. The notification unit 105 refers to the composite image data for the reasons for missing pixels in the areas 202 to 204, and presents re-shooting methods corresponding to the reasons for missing pixels in association with the coordinates of the areas 202 to 204 in the composite image 201.

Figure 3:
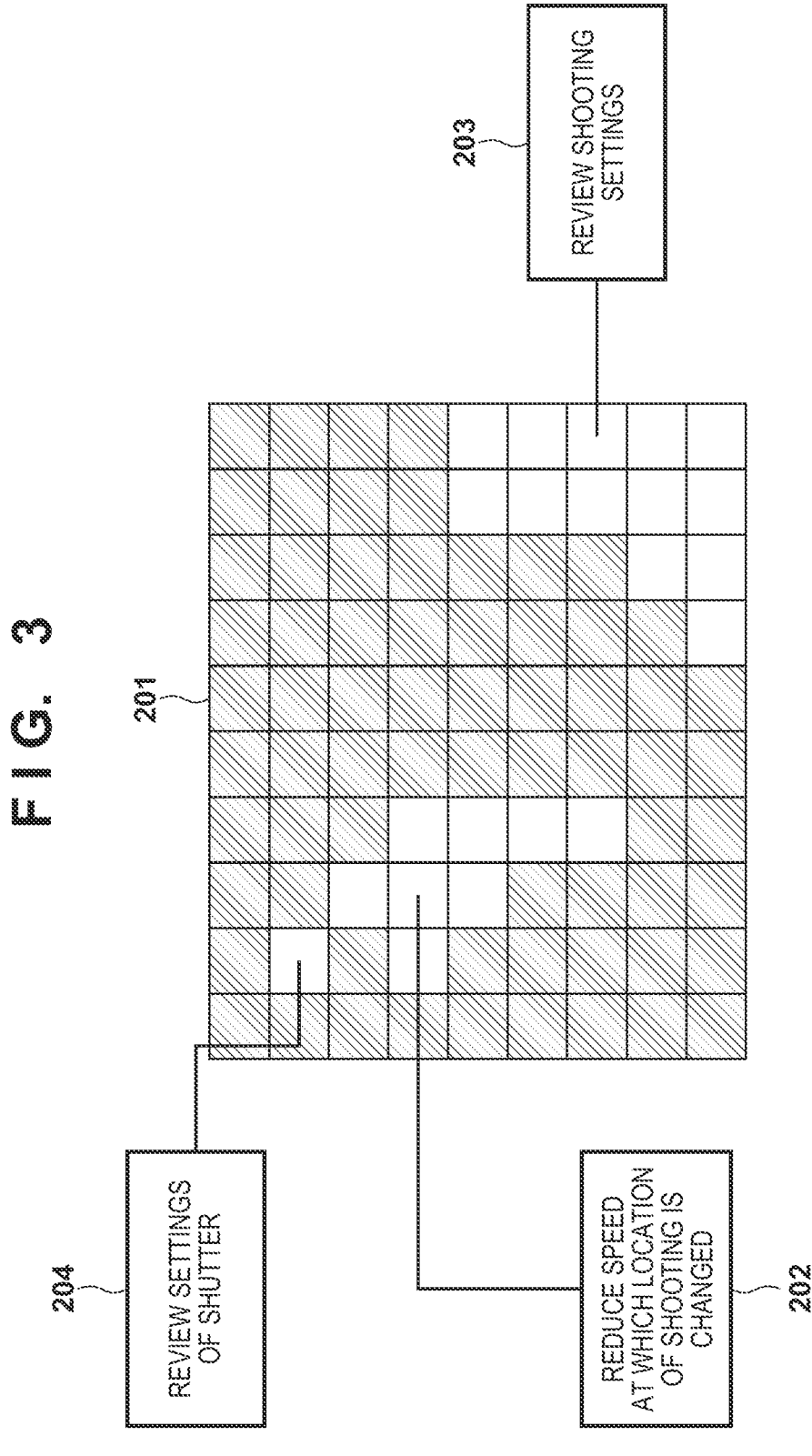
FIG. 3 is a diagram showing an example of presentation of re-shooting methods to be used by the information processing apparatus.

FIG. 3 is a diagram showing an example of a presentation of re-shooting methods to be used by the information processing apparatus. The notification unit 105 provides a notification about the composite image 201 and the re-shooting methods for the areas 202 to 204 shown in FIG. 3 to respective units and the CPU (not shown) of the information processing apparatus, as well as a terminal (not shown), and the like, of a user. The terminal of the user includes, for example, a smartphone, a tablet, a notebook PC, and so forth.

In a case when the reason for missing pixels in the area 202 is the "shortage of overlap", the notification unit 105 provides a notification so that the speed at which the shooting range is changed when the shooting unit 101 shoots a subject (inspection target surfaces) is re-set. For example, in a case when the shooting unit 101 is mounted on a mobile object (drone), the notification unit 105 provides a notification so that the moving speed of the mobile object is reduced. If the speed at which the shooting range is changed with respect to the subject (inspection target surfaces) is reduced, more pieces of shot image data will overlap, and thus the "shortage of overlap" in the composite image 201 will be resolved.

In a case when the mobile object (drone) on which the shooting unit 101 is mounted moves autonomously, the notification unit 105 may directly access the shooting unit 101 and change the settings so as to reduce the moving speed of the mobile object. In a case when the mobile object (drone) on which the shooting unit 101 is mounted moves in accordance with a user operation, the notification unit 105 may provide a notification to the terminal (not shown), and the like, of the user so that the user reduces the speed of the mobile object. Also, there are cases when the composition unit 104 generates a composite image based on a group of still images extracted from moving images of the subject (inspection target surfaces) shot by the shooting unit 101. At this time, in a case when the composite image 201 includes the area 202 attributed to the "shortage of overlap", the notification unit 105 provides a notification so that the interval at which the still images are extracted (captured) from the moving images is reduced.

In a case when the reason for missing pixels in the area 204 is the "failure in shooting", the notification unit 105 provides a notification so that the interval at which the shutter of the shooting unit 101 is released is changed. For example, in a case when the shutter included in the shooting unit 101 is controlled by a user operation, the notification unit 105 provides a notification to the terminal, and the like, of the user so that the interval of a shutter operation is reduced. In a case when the shutter included in the shooting unit 101 is an interval shutter that is automatically operated, the notification unit 105 provides a notification about re-setting of a shooting interval. Here, as the interval shutter is set so as to "shoot one still image every X seconds", the notification is provided so as to reduce "X seconds". The notification unit 105 may directly access the shooting unit 101 and change the settings of the interval shutter. Also, in a case when the shutter included in the shooting unit 101 is controlled by a user operation, the notification unit 105 may provide a notification to the user so that a shutter operation is performed flawlessly.

In a case when the reason for missing pixels in the area 203 is "poor image quality", the notification unit 105 provides a notification so that the shooting settings of the shooting unit 101 are changed. In order to change the shooting settings of the shooting unit 101, the notification unit 105 uses determination information on the image qualities of unused pieces of shot image data that have not been received from the determination unit 103. In a case when the reason for missing pixels in the area 203 is "poor image quality", the determination information always includes shot image data with image quality information for which the image quality has not been determined to be favorable. Image quality information for which the image quality has not been determined to be favorable is information indicating that one of the shooting resolution, focus, and blurring is not favorable. The notification unit 105 decides on the content of change in the shooting settings in the shooting unit 101 with reference to image quality information indicating unfavorable image quality.

In a case when it is determined, for example, that the "shooting resolution" is not favorable based on the determination information (determination result) on the image quality, the notification unit 105 provides a notification so that the setting of the focal length of the shooting unit 101 is changed to the telephoto side. Once the setting of the focal length has been changed to the telephoto side, the shooting range is reduced, and thus the notification unit 105 provides a notification so that the speed at which the shooting range of the shooting unit 101 is changed is reduced, or the shooting interval of the shooting unit 101 is reduced. Alternatively, the notification unit 105 may provide a notification so that the shooting position of the shooting unit 101 further approaches the subject (inspection target surfaces) while maintaining the focal length of the shooting unit 101 as is. In this way, the shooting distance from the shooting unit 101 to the subject (inspection target surfaces) is reduced, and thus the shooting resolution can be further increased.

In a case when it is determined that "focus" is not favorable based on the determination information (determination result) on the image quality, the notification unit 105 provides a notification so that the f-number of the shooting unit 101 is increased. As a result, the depth of field becomes deeper, thereby making it easier to bring the subject (inspection target surfaces) into focus.

In a case when it is determined that "blurring" is not favorable based on the determination information (determination result) on the image quality, the notification unit 105 provides a notification so that the shutter speed of the shooting unit 101 is increased. At this time, together with the foregoing notification, the notification unit 105 may provide a notification so that the ISO film speed is increased. Also, "blurring" may occur in a case when the speed at which the shooting range of the shooting unit 101 is changed is too fast. In view of this, the notification unit 105 may provide a notification so that the speed, at which the shooting range of the shooting unit 101 is changed, is reduced. In a case when the mobile object (drone) on which the shooting unit 101 is mounted moves autonomously, the notification unit 105 may directly access the shooting unit 101 and set the moving speed of the mobile object to be slower. On the other hand, in a case when the mobile object on which the shooting unit 101 is mounted moves in accordance with a user operation, the notification unit 105 may provide a notification to the terminal (not shown) of the user so that the moving speed of the mobile object is reduced. At this time, in a case when the notification unit 105 notifies the terminal of the user of a change in the shooting settings of the shooting unit 101, it may directly access the shooting unit 101 and change the shooting settings in place of the user.

Figure 4:
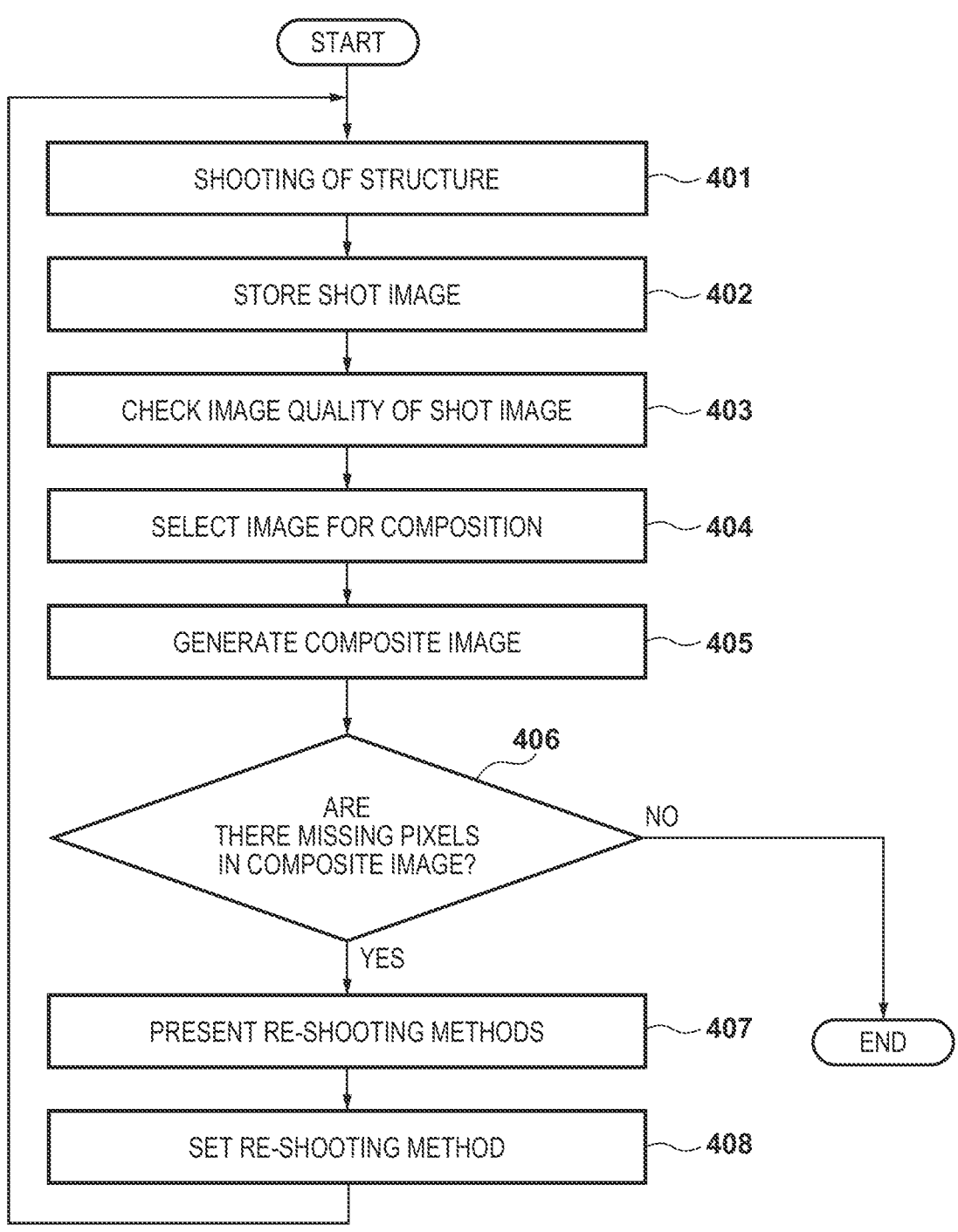
FIG. 4 is a flowchart illustrating a flow of processing executed by the information processing apparatus.

FIG. 4 is a flowchart illustrating a flow of processing executed by the information processing apparatus. The following describes the flowchart of FIG. 4 with reference to FIG. 1A to FIG. 3. Note that program codes that are in conformity with the flowchart are stored in a memory of the storage unit 102 (RAM, ROM, etc.) of the information processing apparatus 100. The present processing is realized by the CPU (not shown), and the like, reading out and executing a program. Note that, in the present flowchart, processing related to transmission and reception of data, and the like, may be executed either directly or via, for example, a wired or wireless network.

In step S401, the shooting unit 101 shoots a subject of a structure to be inspected (inspection target surfaces), and obtains pieces of shot image data. The shooting unit 101 transmits the pieces of shot image data to the storage unit 102, and processing proceeds to step S402.

In step S402, the storage unit 102 stores the pieces of shot image data. The storage unit 102 transmits the pieces of shot image data to the determination unit 103, and processing proceeds to step S403.

In step S403, based on respective pieces of image quality information of the plurality of pieces of shot image data obtained by shooting the subject, the determination unit 103 determines the image quality of each piece of shot image data. The determination unit 103 transmits determination information (determination result) obtained by determining the image quality of each piece of shot image data to the storage unit 102 and the notification unit 105, and processing proceeds to step S404.

In step S404, based on the determination information (determination result) of each piece of shot image data, the storage unit 102 selects pieces of shot image data for generating a composite image. That is to say, the storage unit 102 selects, from among respective pieces of shot image data, only pieces of shot image data for which the determination information (determination result) on the image qualities indicates favorable image qualities. The storage unit 102 transmits the selected pieces of shot image data to the composition unit 104, and processing proceeds to step S405.

In step S405, the composition unit 104 generates a composite image 201 by compositing together the pieces of shot image data with favorable image qualities using a known method (e.g., a method of panoramic composition or a method of three-dimensional reconfiguration), and processing proceeds to step S406.

In step S406, based on whether there is a missing pixel area (for which no pixel value has been recorded) in the composite image 201, the composition unit 104 determines whether to change the shooting settings of the shooting unit 101. In a case when the composition unit 104 determines that there is a missing pixel area (for which no pixel value has been recorded) in the composite image 201 (Yes of step S406), processing proceeds to step S407. In a case when the composition unit 104 determines that there is no missing pixel area (for which no pixel value has been recorded) in the composite image 201 (No of step S406), processing ends.

In step S407, the composition unit 104 determines areas 202 to 204 with missing pixels (for which no pixel value has been recorded) in the composite image 201, and estimates the reasons for missing pixels in the areas 202 to 204. The composition unit 104 records the reasons for missing pixels into composite image data in association with respective positions (coordinates) of the areas 202 to 204. The composition unit 104 transmits the composite image data to the notification unit 105. The notification unit 105 provides a notification about re-shooting methods to be used by the shooting unit 101 based on the determination information on the image qualities of the pieces of shot image data from the determination unit 103, and, on the composite image 201 from the composition unit 104. Thereafter, processing proceeds to step S408.

In step S408, in accordance with a selection of a re-shooting method via a user operation or the notification unit 105, the notification unit 105 changes various types of settings related to re-shooting of the subject (inspection target surfaces) corresponding to the areas 202 to 204 to be performed by the shooting unit 101, and processing returns to step S401.

As described above, according to the first embodiment, image qualities are determined based on pieces of image quality information of pieces of shot image data, and a composite image is generated using images with favorable image qualities based on determination information (determination result) on the image qualities. According to the first embodiment, in a case when there is a missing pixel area in the composite image, a re-shooting method for the missing pixel area can be estimated from the relationship between shooting times of a used image and an unused image. Consequently, in a case when there is a missing pixel area in the composite image, the missing pixel area can be visualized as a location of re-shooting, and a re-shooting method for shooting a subject corresponding to the missing pixel area can be presented.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:

at least one processor coupled to at least one memory, storing instructions that, when executed by the at least one processor, causes the image processing apparatus to function as:

a storage unit configured to store pieces of image quality information, respectively, for a plurality of images that show a subject;

a determination unit configured to determine whether image qualities of the images are favorable based on the pieces of image quality information of the images;

a composition unit configured to generate a composite image using images that have been determined to have favorable image qualities by the determination unit; and a notification unit configured, in a case when there is a missing pixel area in the composite image, to provide a notification about a re-shooting method for the subject corresponding to the missing pixel area, wherein the determination unit determines whether the image qualities of the images are favorable based on a shooting resolution, focus, and blurring, wherein (1), in a case when the determination unit determines that shooting resolution is not favorable based on the pieces of the image quality information of the images, the notification unit provides a notification so that setting of focal length of a shooting unit is changed to a telephoto side, wherein (2), in a case when the determination unit determines that the focus is not unit provides a notification so that an f-number of the shooting unit is increased, wherein (3), in a case when the determination unit determines that the blurring is not favorable based on the pieces of the image quality information of the images, the notification unit provides a notification so that shutter speed of the shooting unit is increased, wherein (4), in a case when the determination unit determines that a reason for the missing pixel area is a shortage of overlap, the notification unit provides a notification so that speed at which the shooting range is changed when the shooting unit shoots the subject is re-set, and wherein (5), in a case when the determination unit determines that a reason for the missing pixel area is a failure in shooting, the notification unit provides a notification so that an interval at which a shutter of the shooting unit is released is reduced.

2. The information processing apparatus according to claim 1, wherein the image processing apparatus is further caused to function as an estimation unit configured, in a case when there is the missing pixel area in the composite image, to estimate a reason for missing pixels.

3. The information processing apparatus according to claim 2, wherein the estimation unit estimates a position of a used image in the composite image and estimates the reason for missing pixels based on whether there is the missing pixel area in an area surrounding the used image, the used image having been used to generate the composite image and having a shooting time that is different, by a predetermined range or less, from a shooting time of an unused image that has not been used to generate the composite image.

4. The information processing apparatus according to claim 2, wherein the estimation unit estimates the reason for missing pixels based on whether there is a missing image between an image located in an area surrounding the missing pixel area in the composite image and an image that is included among used images that have been used to generate the composite image and that is adjacent to the image in terms of a shooting order.

5. The information processing apparatus according to claim 2, wherein the estimation unit estimates the reason for missing pixels based on whether a size of the missing pixel area in the composite image exceeds a threshold.

6. The information processing apparatus according to claim 2, wherein the estimation unit estimates, based on at least one of a time of occurrence of a shooting failure event in the shooting unit for shooting the subject and a time at which the subject is shot when a moving speed of a mobile object on which the shooting unit is mounted has exceeded a threshold, a position of a used image with a shooting time that is different from the time by a predetermined range or less in the composite image, and estimates the reason for missing pixels, based on whether there is the missing pixel area in an area surrounding the used image.

7. The information processing apparatus according to claim 2, wherein the notification unit provides the notification about the re-shooting method for the subject corresponding to the missing pixel area based on the reason for missing pixels estimated by the estimation unit.

8. The information processing apparatus according to claim 2, wherein the reason for missing pixels includes at least one of the shortage of overlap, the failure in shooting, and poor image quality.

9. The information processing apparatus according to claim 1, wherein the notification unit provides the notification about the re-shooting method for the subject corresponding to the missing pixel area based on pieces of image quality information of unused images that have not been used to generate the composite image.

10. The information processing apparatus according to claim 1, wherein the notification unit notifies a terminal of a user of information in which a position of the missing pixel area in the composite image and the re-shooting method for the subject corresponding to the missing pixel area are associated with each other, and the notification unit provides, for each missing pixel area in the composite image, a notification about a re-shooting method of any one of (1) to (5).

11. The information processing apparatus according to claim 1, wherein the pieces of image quality information of the images include a plurality of elements with which the image qualities of the images are evaluated, and the determination unit determines whether the image qualities of the images are favorable based on at least one of the plurality of elements.

12. The information processing apparatus according to claim 1, wherein the storage unit stores a determination result of the determination made by the determination unit, and transmits, to the composition unit, images for which the determination result indicates that the image qualities are favorable.

13. The information processing apparatus according to claim 1, wherein the image processing apparatus is further caused to function as the shooting unit configured to shoot the subject.

14. The information processing apparatus according to claim 1, wherein the subject is a structure, and the information processing apparatus is used in an inspection of the structure.

15. A shooting system comprising:

a mobile object including a shooting unit configured to shoot a subject; and an information processing apparatus that processes images shot by the shooting unit, wherein the information processing apparatus includes:

at least one processor coupled to at least one memory, storing instructions that, when executed by the at least one processor, causes the image processing apparatus to function as:

a storage unit configured to store pieces of image quality information, respectively, for a plurality of images that show the subject;

a determination unit configured to determine whether image qualities of the images are favorable based on the pieces of image quality information of the images;

a composition unit configured to generate a composite image using images that have been determined to have favorable image qualities by the determination unit; and a notification unit configured, in a case when there is a missing pixel area in the composite image, to provide a notification about a re-shooting method for the subject corresponding to the missing pixel area, wherein the determination unit determines whether the image qualities of the images are favorable based on a shooting resolution, focus, and blurring, wherein (1), in a case when the determination unit determines that shooting resolution is not favorable based on the pieces of the image quality information of the images, the notification unit provides a notification so that setting of focal length of a shooting unit is changed to a telephoto side, wherein (2), in a case when the determination unit determines that the focus is not unit provides a notification so that an f-number of the shooting unit is increased, wherein (3), in a case when the determination unit determines that the blurring is not favorable based on the pieces of the image quality information of the images, the notification unit provides a notification so that shutter speed of the shooting unit is increased, wherein (4), in a case when the determination unit determines that a reason for the missing pixel area is a shortage of overlap, the notification unit provides a notification so that speed at which the shooting range is changed when the shooting unit shoots the subject is re-set, and wherein (5), in a case when the determination unit determines that a reason for the missing pixel area is a failure in shooting, the notification unit provides a notification so that an interval at which a shutter of the shooting unit is released is reduced.

16. A shooting system comprising:

a tripod head;

a shooting unit configured to shoot a subject, the shooting unit being mounted on the tripod head; and an information processing apparatus that processes images shot by the shooting unit, wherein the information processing apparatus includes:

at least one processor coupled to at least one memory, storing instructions that, when executed by the at least one processor, causes the shooting system to function as:

a storage unit configured to store pieces of image quality information, respectively, for a plurality of images that show the subject;

a determination unit configured to determine whether image qualities of the images are favorable based on the pieces of image quality information of the images;

a composition unit configured to generate a composite image using images that have been determined to have favorable image qualities by the determination unit; and a notification unit configured, in a case when there is a missing pixel area in the composite image, to provide a notification about a re-shooting method for the subject corresponding to the missing pixel area, wherein the determination unit determines whether the image qualities of the images are favorable based on a shooting resolution, focus, and blurring, wherein (1), in a case when the determination unit determines that shooting resolution is not favorable based on the pieces of the image quality information of the images, the notification unit provides a notification so that setting of focal length of a shooting unit is changed to a telephoto side, wherein (2), in a case when the determination unit determines that the focus is not favorable based on the pieces of the image quality information of the images, the notification unit provides a notification so that an f-number of the shooting unit is increased, wherein (3), in a case when the determination unit determines that the blurring is not favorable based on the pieces of the image quality information of the images, the notification unit provides a notification so that shutter speed of the shooting unit is increased, wherein (4), in a case when the determination unit determines that a reason for the missing pixel area is a shortage of overlap, the notification unit provides a notification so that speed at which the shooting range is changed when the shooting unit shoots the subject is re-set, and wherein (5), in a case when the determination unit determines that a reason for the missing pixel area is a failure in shooting, the notification unit provides a notification so that an interval at which a shutter of the shooting unit is released is reduced.

17. A method comprising:

storing pieces of image quality information, respectively, for a plurality of images that show a subject;

determining whether image qualities of the images are favorable based on the pieces of image quality information of the images;

generating a composite image using images that have been determined to have favorable image qualities by the determining; and, in a case when there is a missing pixel area in the composite image, providing a notification about a re-shooting method for the subject corresponding to the missing pixel area, wherein the determining determines whether the image qualities of the images are favorable based on a shooting resolution, focus, and blurring, wherein (1), in a case when the determination unit determines that shooting resolution is not favorable based on the pieces of the image quality information of the images, the notification unit provides a notification so that setting of focal length of a shooting unit is changed to a telephoto side, wherein (2), in a case when the determination unit determines that the focus is not unit provides a notification so that an f-number of the shooting unit is increased, wherein (3), in a case when the determination unit determines that the blurring is not favorable based on the pieces of the image quality information of the images, the notification unit provides a notification so that shutter speed of the shooting unit is increased, wherein (4), in a case when the determination unit determines that a reason for the missing pixel area is a shortage of overlap, the notification unit provides a notification so that speed at which the shooting range is changed when the shooting unit shoots the subject is re-set, and wherein (5), in a case when the determination unit determines that a reason for the missing pixel area is a failure in shooting, the notification unit provides a notification so that an interval at which a shutter of the shooting unit is released is reduced.

18. A non-transitory computer-readable storage medium storing a program that, when executed by a computer, causes the computer to perform a method of controlling an information processing apparatus, the method comprising:

storing pieces of image quality information, respectively, for a plurality of images that show a subject;

determining whether image qualities of the images are favorable based on the pieces of image quality information of the images;

generating a composite image using images that have been determined to have favorable image qualities by the determining; and, in a case when there is a missing pixel area in the composite image, providing a notification about a re-shooting method for the subject corresponding to the missing pixel area, wherein the determining determines whether the image qualities of the images are favorable based on a shooting resolution, focus, and blurring, wherein (1), in a case when the determination unit determines that shooting resolution is not favorable based on the pieces of the image quality information of the images, the notification unit provides a notification so that setting of focal length of a shooting unit is changed to a telephoto side, wherein (2), in a case when the determination unit determines that the focus is not favorable based on the pieces of the image quality information of the images, the notification unit provides a notification so that an f-number of the shooting unit is increased, wherein (3), in a case when the determination unit determines that the blurring is not favorable based on the pieces of the image quality information of the images, the notification unit provides a notification so that shutter speed of the shooting unit is increased, wherein (4), in a case when the determination unit determines that a reason for the missing pixel area is a shortage of overlap, the notification unit provides a notification so that speed at which the shooting range is changed when the shooting unit shoots the subject is re-set, and wherein (5), in a case when the determination unit determines that a reason for the missing pixel area is a failure in shooting, the notification unit provides a notification so that an interval at which a shutter of the shooting unit is released is reduced.

\* \* \* \* \*